United States Patent [19]

Williams

[11] Patent Number: 5,230,812

[45] Date of Patent: Jul. 27, 1993

[54] PRESSURE VESSEL

[76] Inventor: Richard T. Williams, P.O. Box 39, Uwchland, Chester County, Pa. 19480

[21] Appl. No.: 921,513

[22] Filed: Jul. 29, 1992

[51] Int. Cl.$^5$ .................... B01D 37/00; B01D 27/00
[52] U.S. Cl. .................... 210/767; 210/436; 210/439; 210/444; 210/440; 210/441; 210/456; 220/324; 220/367; 220/541; 220/542
[58] Field of Search ............... 210/767, 436, 439, 444, 210/440, 441, 125, 456; 220/541, 542, 324, 367; 156/64, 73.2; 222/185

[56] References Cited

U.S. PATENT DOCUMENTS

| | | | |
|---|---|---|---|
| 2,932,400 | 4/1960 | Scavuzzo | 210/444 |
| 3,225,929 | 12/1965 | Sicard | 210/444 |
| 3,262,570 | 7/1966 | Gailitis et al. | 210/444 |
| 3,283,098 | 11/1966 | Bair et al. | 210/444 |
| 3,502,221 | 3/1970 | Butterfield | 210/444 |
| 3,635,370 | 1/1972 | Romanauskas | 220/582 |
| 3,640,032 | 8/1972 | Jubb | 220/582 |
| 4,764,275 | 8/1988 | Robichaud | 210/440 |
| 5,036,996 | 8/1991 | Epstein | 220/582 |
| 5,114,572 | 5/1992 | Hunter et al. | 210/440 |

Primary Examiner—Robert A. Dawson
Assistant Examiner—Ana M. Fortuna
Attorney, Agent, or Firm—John F. A. Earley; John F. A. Earley, III

[57] ABSTRACT

A pressure vessel for holding a cartridge, loose media, and the like for conditioning and/or purifying fluid, comprises a cover having a top wall and a side wall extending downwardly therefrom, the side wall having an inner surface, a bowl positioned below the cover and having a bottom wall and a side wall extending upwardly therefrom the side wall having an outer surface, sealing device between the cover and the bowl for sealing between the cover and the bowl, and securing device for securing the cover to the bowl, the securing device including a track comprising a first groove formed in the inner surface of the side wall of the cover and a second groove formed in the outer surface of the side wall of the bowl and being aligned with the first groove, an opening formed in the cover for providing an entrance to the track, and a flexible shear rod received in said track.

21 Claims, 5 Drawing Sheets

PRESSURE VESSEL

BACKGROUND OF THE INVENTION

1. Field of the Invention

This invention relates to a pressure vessel for holding a cartridge, loose media, and the like for conditioning and/or purifying fluid, and particularly concerns a pressure vessel which includes a cover and a bowl, and a flexible shear rod for securing the cover to the bowl. The invention also relates to a manifold mounted and sealed to the cover via an O-ring groove assembly, ultrasonic insertion, and/or a silicone sealant disposed between the manifold and the cover.

2 Description of the Prior Art

A pressure vessel for holding a cartridge filter and the like for conditioning and/or purifying fluid typically comprises a cover, a bowl, an O-ring seal, and a V-clamp to hold the cover to the bowl and to compress the O-ring seal.

Closing a pressure vessel using a V-clamp requires carefully aligning the cover and the bowl while at the same time manipulating the V-clamp. This is a fairly cumbersome task, and a very difficult task for a person with arthritic hands or for a person working on a pressure vessel that is positioned in a constrained area.

SUMMARY OF THE INVENTION

It is an object of the invention to provide a pressure vessel that does not require a V-clamp to close it.

It is another object to provide a pressure vessel that is easy to close.

These and other objects are accomplished by providing a pressure vessel that comprises a cover having a top wall and a side wall extending downwardly therefrom, the side wall having an inner surface, a bowl positioned below the cover and having a bottom wall and a side wall extending upwardly therefrom, the side wall having an outer surface, sealing means positioned between the cover and the bowl for sealing the cover to the bowl, and securing means for securing the cover of the bowl.

The securing means includes a track comprising a first groove formed in the inner surface of the cover and a second groove formed in the outer surface of the bowl and aligned with the first groove. An opening is formed in the cover for providing an entrance to the track, and a flexible shear rod is received in the track for blocking the cover from sliding off the bowl.

A manifold is mounted to the top wall of the cover, the manifold having an inlet tube and an outlet tube that protrude from a first hole and a second hole formed in the top wall of the cover.

DETAILED DESCRIPTION OF THE DRAWINGS

Figure 1:
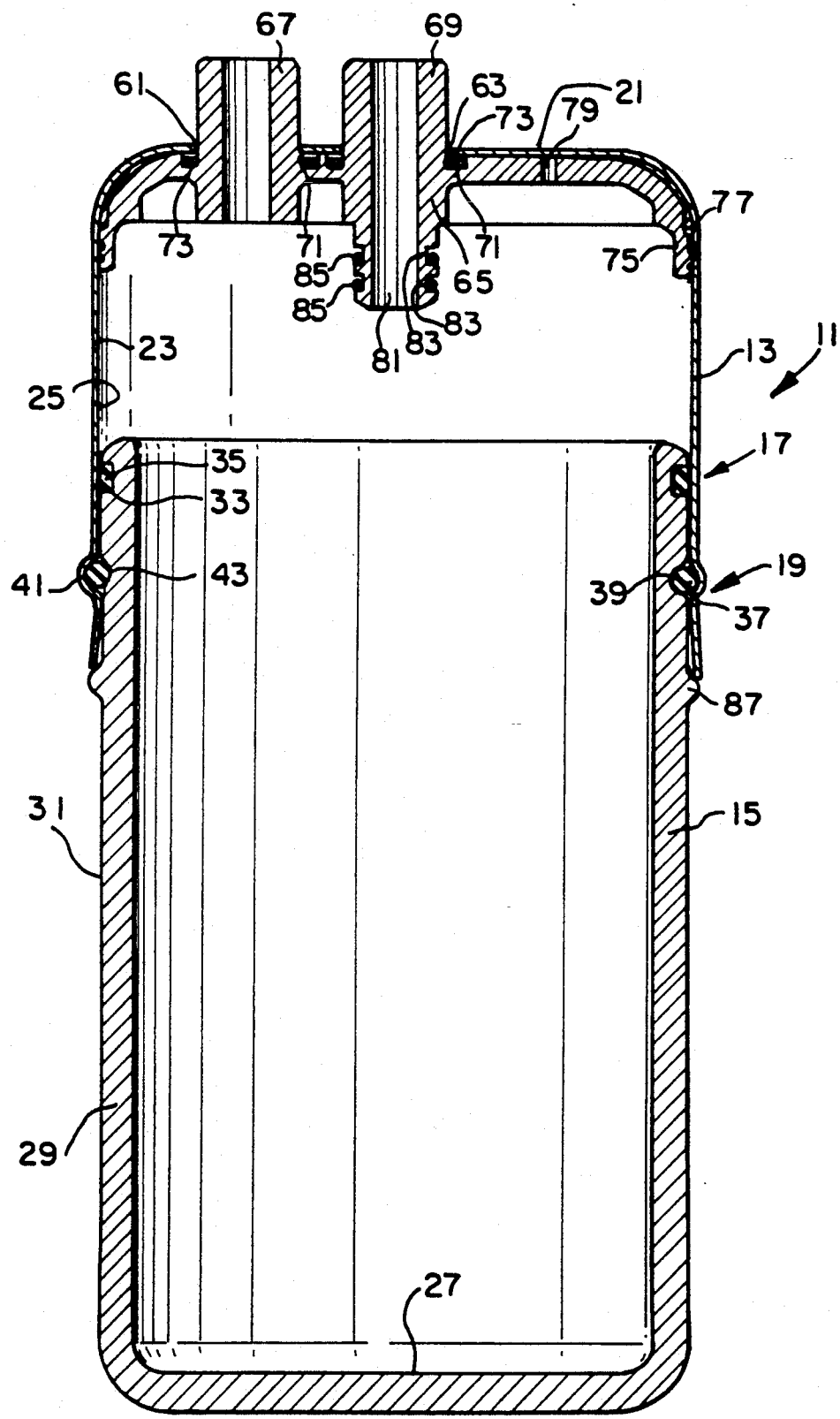
FIG. 1 is a view in cross section of a pressure vessel constructed in accordance with this invention.

Turning now to the drawings, there is shown in FIG. 1 a pressure vessel 11 for holding a cartridge, loose media, and the like for conditioning and/or purifying fluid. Pressure vessel 11 comprises a cover 13, a bowl 15 positioned below the cover, sealing means 17 between the cover 13 and the bowl 15 for sealing between the cover 13 and the bowl 15, and securing means 19 for securing the cover 13 to the bowl 15.

Cover 13 has a top wall 21 and a side wall 23 extending downwardly from the top wall 21. The side wall 23 has an inner surface 25.

Bowl 15 has a bottom wall 27 and a side wall 29 extending upwardly from the bottom wall 27. The side wall 29 has an outer surface 31.

Sealing means 17 includes a sealing groove 33 that is formed in the outer surface 31 of the side wall 29 of bowl 15, and a gasket 35 that is seated in the sealing groove 33 and seals between the cover 13 and the bowl 15 when compressed between the inner surface 25 of side wall 23 of cover 13 and outer surface 31 of side wall 29 of bowl 15 at sealing groove 33. Preferably, gasket 35 has a substantially rectangular or substantially circular cross section.

Figure 4:
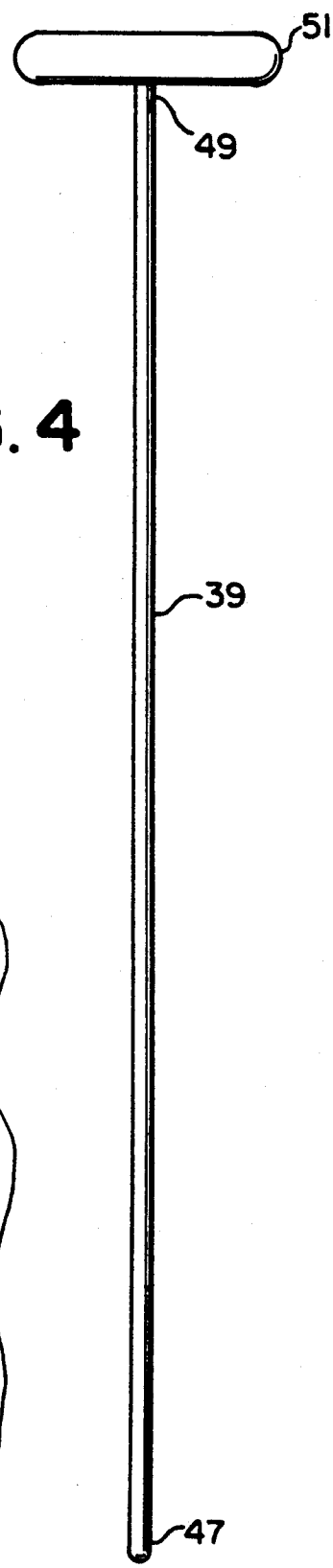
FIG. 4 is a view in top plan and shows the flexible shear rod of the invention.
Figure 5:
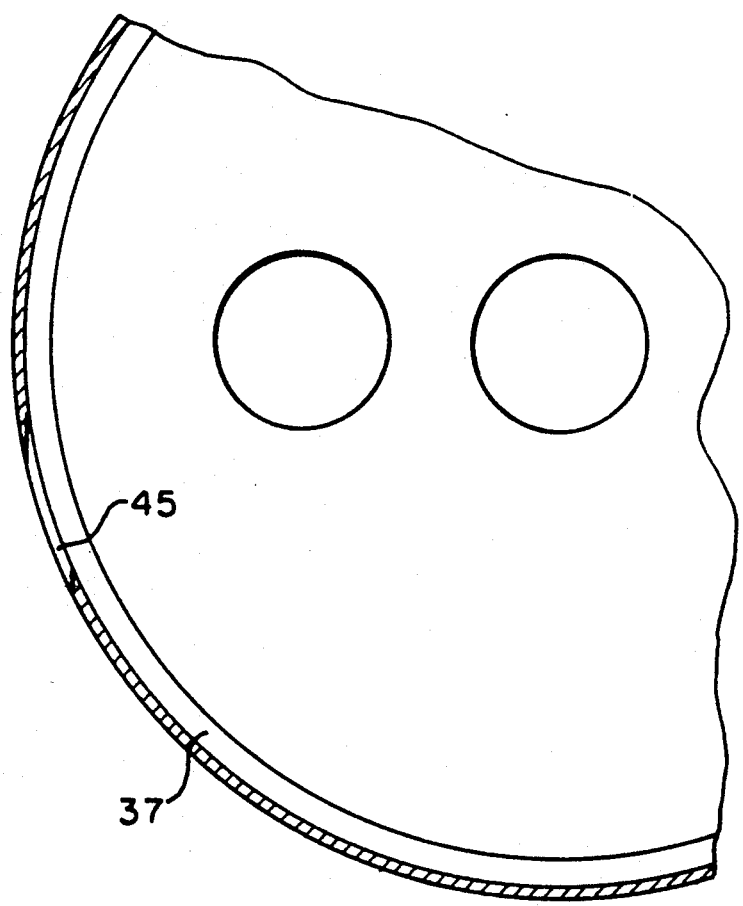
FIG. 5 is a sectional view taken along the lines and arrows A—A in FIG. 1, and shows a track formed in the cover of the pressure vessel of the invention.

Referring to FIGS. 1, 4, and 5, securing means 19 includes a track 37 and a flexible shear rod 39 that is received in track 37. Track 37 includes a first groove 41 formed in the inner surface 25 of side wall 23 of cover 13 and a second groove 43 that is formed in the outer surface 31 of side wall 29 of bowl 15, first groove 41 being aligned with second groove 43 to form track 37. An opening 45 (FIG. 5) is formed in cover 13 for providing an entrance to the track 37. The diameter of track 37 is such that flexible sheer rod 39 fits snugly in track 37 and blocks the cover 13 from sliding off the bowl 15.

As shown in more detail in FIG. 4, flexible shear rod 39 has a leading end portion 47 and a trailing end portion 49. A handle 51 is mounted on trailing end portion 49 to facilitate removal of flexible shear rod 39 from track 37 when it is desired to disconnect cover 13 from bowl 15. Flexible shear rod 39 is formed of a material which is strong, so that it may be used to secure cover 13 to bowl 15, and yet flexible, so that it may be easily snaked into track 37. The flexible shear rod 39 may be made of a variety of flexible materials such as stainless steel or other metal wire or cable, reinforced or non-reinforced plastic, thermosets, or thermoplastics. If flexible shear rod 39 is made of metal wire, it is desirable to eliminate a frayed end of leading end portion 47 of flexible shear rod 39 by welding the wire fibers together to form a bead or ball at the end of leading end portion 47. Preferably, such a bead or ball has a diameter equal to or less than the diameter of the flexible shear rod 39 so that track 37 need only have a diameter large enough to hold the flexible shear rod 39.

As shown in FIG. 1, top wall 21 of cover 13 has a first hole 61 and a second wall 63. A manifold 65, having an inlet tube 67 and an outlet tube 69, is mounted to the top wall 21 of cover 13 with inlet tube 67 protruding from first hole 61 and With outlet tube 69 protruding from second hole 63. Grooves 71 are formed in manifold 65 around inlet tube 67 and outlet tube 69, and a gasket 73 is seated in each groove 71 to seal between manifold 65 and cover 13. Gasket 73 is preferably an O-ring, although other types of gaskets may be used.

Manifold 65 is also provided with a grooved edge portion 75 adapted to secure a silicone seal 77 or the like between it and the inner surface 25 of side wall 23 of cover 13, to aid in securing and sealing between the manifold 65 and the cover 13.

Preferably, manifold 65 is mounted on and sealed to top wall 25 of cover 13 by ultrasonic insertion. A vent 79 is provided in manifold 65 to permit air to escape from between top wall 21 of cover 13 and manifold 65 as manifold 65 is being mounted to top wall 21 of cover 13.

Manifold 65 has a sealing port 81 mounted on or integral with its outlet tube 69 that is adapted to receive a cartridge filter. Sealing port 81 is provided with grooves 83 which surround it, and gaskets 85 are seated in grooves 83 to provide a seal between a sealing port 81 and the cartridge filter.

Bowl 15 is provided with a positioning flange 87 formed on the outer surface 31 of side wall 29 of bowl 15. Positioning flange 87 interacts with the edge of the side wall 23 of cover 13 to position cover 13 properly onto bowl 15 such that first groove 41 of track 37 is aligned with second groove 43 of track 37.

In operation, the upper end portion of a cartridge filter is attached to sealing port 81, bowl 15 is inserted into cover 13 until the edge of side wall 23 of cover 13 abuts positioning flange 87 thereby aligning first groove 41 of track 37 with second groove 43 of track 37, the leading edge portion 47 of flexible shear rod 39 is inserted through opening 45, and the flexible shear rod 39 is snaked into track 37 to secure the cover 13 to the bowl 15 by blocking the cover 13 from sliding off the bowl 15.

When cover 13 is secured to bowl 15, gasket 35 is compressed between the side wall 23 of cover 13 and the side wall 29 of bowl 15 to seal between the cove 13 and the bowl 15.

Fluid, such as untreated water, may be passed into the pressure vessel 11 through inlet tube 67 of manifold 65, through the cartridge filter secured inside pressure vessel 11 to purify and/or treat the untreated fluid, and through sealing port 81 and outlet tube 69 to a receiving container for holding the purified and/or treated fluid.

When it is desired to replace the cartridge filter secured in pressure vessel 11, pressure vessel 11 ma be opened by removing the flexible shear rod 39 from track 37 by pulling on handle 51. With flexible shear rod 39 removed from track 37, cover 13 may be removed from bowl 15 to permit the used cartridge filter to be removed from pressure vessel 11 and replaced with a fresh cartridge filter.

Figure 2:
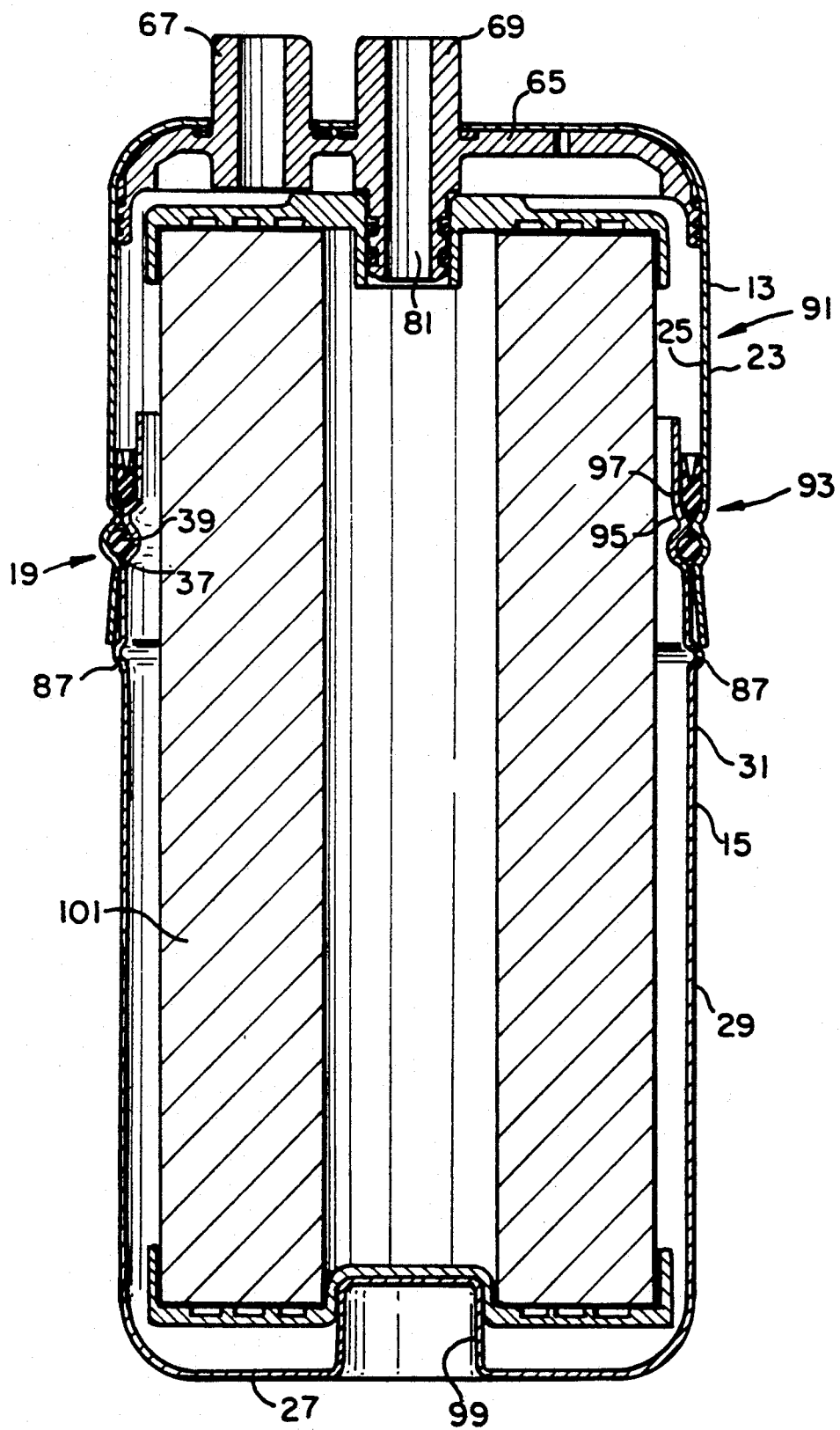
FIG. 2 is a view in cross section of an alternative embodiment of the invention, and shows a cartridge filter mounted in the pressure vessel.

Turning now to FIG. 2, there is shown a pressure vessel 91 which is an alternative embodiment of the invention. Pressure vessel 91 is substantially the same as pressure vessel 11 except that pressure vessel 91 has sealing means 93 for sealing between the cover 13 and the bowl 15, rather than the sealing means 19 of pressure vessel 11.

Sealing means 93 comprises a lip ledge 95 formed on the outer surface 31 of the bowl 15, and a gasket 97 disposed on the lip ledge 95. Gasket 97 gasket 97 is annular and merely sits on lip ledge 95. However, gasket 97 may also be bonded to the inner surface 25 of side wall 23 of cover 13, or to the lip ledge 95, or to the outer surface 31 of side wall 29 of bowl 15. The two legs of gasket 97 are outwardly disposed, and when bowl 15 is inserted into cover 13 the legs of gasket 97 are compressed towards each other between the side wall 23 of cover 13 and the side wall 29 of the bowl 15. Because the gasket 97 is resilient, its compressed legs push against side wall 23 of cover 13 and side wall 29 of bowl 15 to provide a seal. Further, when fluid pressure is applied against gasket 97 during use of pressure vessel 91, it spreads the legs outwardly to enhance the sealing engagement of gasket 97 with side wall 23 of cover 13 and side wall 29 of bowl 15.

Pressure vessel 91 is also provided with an anti-sway stub 99 formed in the bottom wall 27 of bowl 15. Anti-sway stub 99 is adapted to have the lower end portion of a cartridge filter 101 fitted over it to prevent the cartridge filter 101 from swaying back and forth inside pressure vessel 91 during use.

Figure 3:
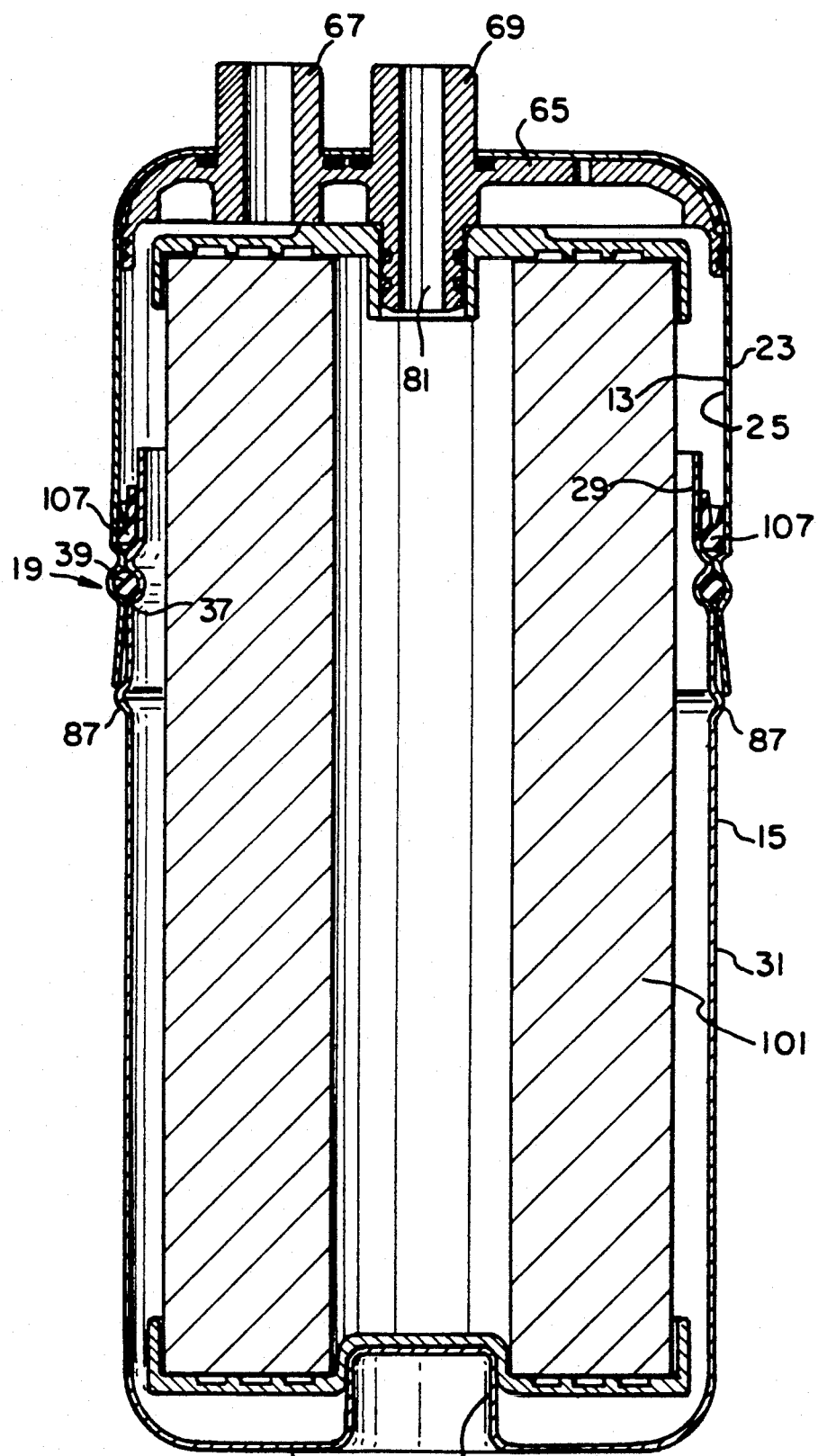
FIG. 3 is a view in cross section of another alternative embodiment of the invention.

Turning now to FIG. 3, there is shown a pressure vessel 105 which is another alternative embodiment of the invention. Pressure vessel 105 is substantially the same as that of pressure vessel 91, except that a gasket 107 is used rather than the gasket 97 of pressure vessel 91.

Gasket 107 is sealingly mounted directly to the inner surface 25 of side wall 23 of cover 13, preferably by vulcanization, and gasket 107 has a leg that protrudes inwardly toward the bowl 15. When bowl 15 is inserted into cover 13, the leg of gasket 107 is pushed toward the side wall 23 of cover 13 by the side wall 29 of bowl 15. However, because gasket 107 is resilient, the leg of gasket 107 pushes against the side wall 29 of bowl 15. Further, in a fashion similar to the double-legged gasket 97 of pressure vessel 91, fluid pressure during operation of pressure vessel 105 acts to push the leg of gasket 107 against the side wall 29 of bowl 15, thereby effecting a seal between cover 13 and the bowl 17.

Figure 6:
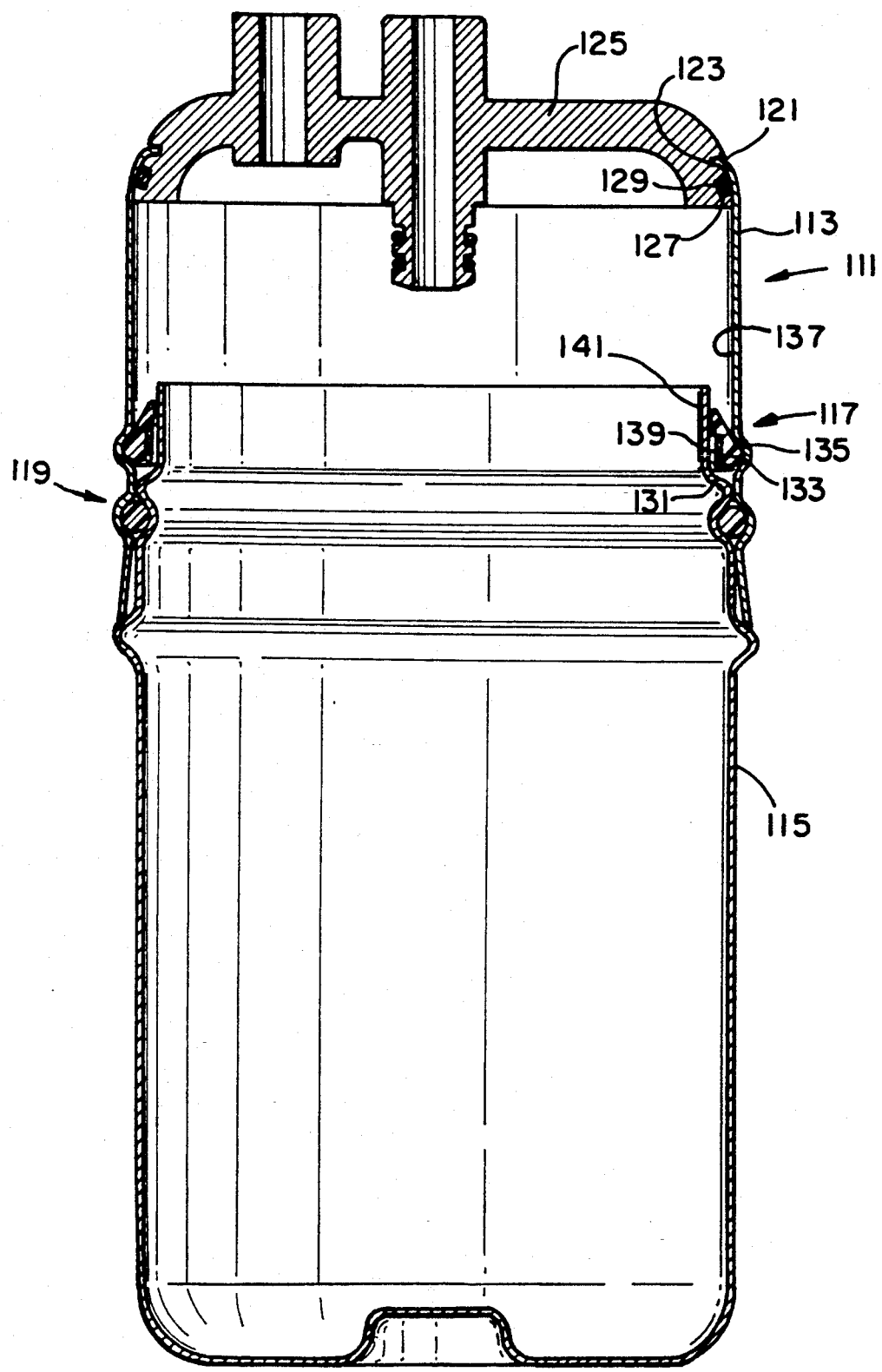
FIG. 6 is a view in cross section of another alternative embodiment of the invention.

Turning now to FIG. 6, there is shown a pressure vessel 111 which is another alternative embodiment of the invention. Pressure vessel 111 comprises a cover 113, a bowl 115 positioned below the cover 113, sealing means 117 between the cover 113 and the bowl 115 for sealing between the cover 113 and the bowl 115, and securing means 119 for securing the cover 113 to the bowl 115.

Cover 113 has an opened upper end portion 121 that is inwardly swagged into an annular groove 123 formed in a manifold 125. An annular gasket 127 is seated in an annular groove 129 formed in manifold 125 to seal between the manifold 125 and the cover 113.

Bowl 115 is substantially the same as the bowl of pressure vessels 91 and 105, bowl 115 having a lip ledge 131.

Sealing means 117 includes a one-legged gasket 133 seated in an annular groove 135 formed on the inner side wall 137 of cover 113 and secured in place by an annular compression ring 139 that is positioned above lip ledge 131 and is aligned with groove 135. Compression ring 139, which is rigid and has a diameter greater than the inner diameter of gasket 133 when gasket 133 is relexed (uncompressed), forces gasket 133 tightly into groove 135 by compressing the resilient gasket 133 between compression ring 139 and inner side wall 137 of cover 113 at groove 135. The leg of gasket 133, which is normally biased inwardly towards the side wall 141 of bowl 115, is pushed in the direction of side wall 137 of cover 113 by bowl 115 when bowl 115 is placed into cover 113, but due to the resiliency of gasket 133, the leg of gasket 133 pushes against side wall 141 of bowl 115. Further, during operation, fluid pressure pushes the leg of gasket 133 against the side wall 141 of bowl 115.

The securing means 119 of pressure vessel 111 is the same as the securing means 19 of pressure vessel 11.

The gasket used in the various embodiments of the invention are preferably made of rubber, but other resilient materials may also be used.

The cover and the bowl of the invention may be formed of either metal or plastic, depending on the application and desirability of each material.

The cover may also be formed having a manifold integrally formed therewith, such that the cover and manifold form a single piece unit.

ADVANTAGES

Advantages of the pressure vessel of this invention include an easy and effective way to close the two halves of a pressure vessel in a strong and secure manner. The pressure vessel of the invention may be opened and closed in seconds. Further, the pressure vessel of the invention has an inexpensive, yet effective closure device 19 which may be used much more easily than the conventional V-clamp closure device used with conventional pressure vessels, especially by those with arthritic hands or by those working on pressure vessels that are positioned in constrained places.

I claim:

1. A pressure vessel for holding a filter for conditioning and/or purifying fluid, comprising
   a cover having a top wall and a side wall extending downwardly therefrom, the side wall having an inner surface,
   inlet and outlet means formed in the cover for introducing fluid to and for removing fluid from the pressure vessel,
   a bowl positioned below the cover and having a bottom wall and a side wall extending upwardly therefrom, the side wall having an outer surface,
   sealing means between the cover and the bowl for sealing between the cover and the bowl, and
   securing means for securing the cover to the bowl,
   said securing means including a track comprising a first groove formed in the inner surface of the side wall of the cover and a second groove formed in the outer surface of the side wall of the bowl and being aligned with the first groove, an opening formed in the cover for providing an entrance to the track, and a flexible shear rod received in said track.

2. The pressure vessel of claim 1, the shear rod having a leading end portion and a trailing end portion and guiding means for guiding the shear rod within said track, said guiding means including a bead formed on the leading end portion of the shear rod.

3. The pressure vessel of claim 2, the bead having a diameter equal to or less than the diameter of the shear rod.

4. The pressure vessel of claim 1, the sealing means including a sealing groove formed in the outer surface of the side wall of the bowl, and a gasket seated in said sealing groove.

5. The pressure vessel of claim 4, the gasket having a substantially rectangular or circular cross-section.

6. The pressure vessel of claim 1, wherein the bowl further comprises a lip ledge formed on its outer surface, and the sealing means including a gasket disposed on said lip ledge, said gasket having a substantially U-shaped cross-section.

7. The pressure vessel of claim 1, the sealing means including a sealing gasket which is mounted on the inner surface of the side wall of the cover and which contacts the outer surface of the side wall of the bowl.

8. The pressure vessel of claim 7, the gasket being bonded to the cover by vulcanization or adhesives.

9. The pressure vessel of claim 7, the gasket having a single leg protruding inwardly.

10. The pressure vessel of claim 1, the sealing means including a sealing gasket mounted onto the inner surface of the cover and being compressed and held in place between a compression ring and the cover.

11. The pressure vessel of claim 1, further comprising a manifold mounted to the top wall of the cover, said manifold having an upper portion, and said manifold including a hollow inlet tube and a hollow outlet tube formed in and extending through it, said tube protruding from the top wall of the cover.

12. The pressure vessel of claim 11, the inlet and outlet means formed in the cover comprising a first hole and a second hole formed in the top wall of the cover, and grooves formed in the upper portion of the manifold aligned with the first hole and the second hole of the cover, and a gasket seated in each groove.

13. The pressure vessel of claim 11, the manifold being sealed to the inner surface of the top wall of the cover by an O-ring, ultrasonic insertion, adhesive bonding, or a combination of both ultrasonic insertion and bonding.

14. The pressure vessel of claim 11, the manifold having a lower edge portion, the vessel further including a silicone seal or an adhesive between the lower edge portion of the manifold and the inner surface of the side wall of the cover.

15. The pressure vessel of claim 11, further comprising means for securing a cartridge within the vessel, said securing means including a sealing port mounted on or being integral with the outlet tube, and an anti-sway stub formed in the bottom wall of the bowl.

16. The pressure vessel of claim 15, further comprising a cartridge having an upper end portion and a lower end portion, the upper end portion being secured to the sealing port and the lower end portion being fitted over the anti-sway stub.

17. The pressure vessel of claim 1, further including a manifold formed integrally with the cover.

18. A pressure vessel for holding a filter for conditioning and/or purifying fluid, comprising
   a cover having a top wall and a side wall extending downwardly therefrom, the side wall having an inner surface,
   a bowl positioned below the cover and having a bottom wall and a side wall extending upwardly therefrom, the side wall having an outer surface,
   sealing means between the cover and the bowl for sealing between the cover and the bowl,
   securing means for securing the cover to the bowl,
   said securing means including a track comprising a first groove formed in the inner surface of the side wall of the cover and a second groove formed in the outer surface of the side wall of the bowl and being aligned with the first groove, an opening formed in the cover for providing an entrance to the track, and a flexible shear rod received in said track,
   the shear rod having a leading end portion and a trailing end portion and guiding means for guiding the shear rod within said track, said guiding means including a bead formed on the leading end portion of the shear rod, the bead having a diameter equal to or less than the diameter of the shear rod, the sealing means being a gasket vulcanized on or otherwise bonded or compressed against the inner surface of the cover, the gasket having a single leg protruding inwardly, further comprising a first hole and a second hole formed in the top wall of the cover, and a manifold mounted to the top wall of the cover, said manifold having an upper portion, and said manifold including a hollow inlet tube and a hollow outlet tube formed in and extending through the upper portion, said tubes protruding from the top wall of the cover, further comprising grooves formed in the upper portion of the manifold aligned with the first hole and the second hole of the cover, and a gasket seated in each groove, the manifold being sealed to the inner surface of the top wall of the cover by an O-ring, ultrasonic insertions, adhesive bonding, or a combination of both ultrasonic insertions and adhesive bonding, the manifold having a lower edge portion, the vessel further including a silicone seal or an adhesive between the lower edge portion of the manifold and the inner surface of the side wall of the cover, further comprising means for securing a cartridge within the vessel, said securing means including a hollow sealing port mounted on or being integral with the outlet tube, and an anti-sway stub formed in the bottom wall of the bowl, and further comprising a cartridge having an upper end portion and a lower end portion, the upper end portion being secured to the sealing port and the lower end portion being fitted over the anti-sway stub.

19. A method of assembling a manifold within a pressure vessel which comprises a cover having a top wall and an inner surface, a bowl positioned below the cover and having a bottom wall and an outer surface, sealing means positioned between the cover and the bowl for sealing between the cover and the bowl, securing means for securing the cover to the bowl, said securing means including a track comprising a first groove formed in the inner surface of the cover and a second groove formed in the outer surface of the bowl and being aligned with the first groove, an opening formed in the cover for providing an entrance to the track, and a flexible shear rod received in said track, further comprising a first hole and a second hole formed in the top wall of the cover, and a manifold to be received in the inner surface of the top wall of the cover, said manifold having an upper portion, said manifold including a hollow inlet tube and a hollow outlet tube formed in the upper portion, the manifold having a lower edge portion, and said manifold further comprising grooves formed in the upper portion of the manifold aligned with the first hole and the second hole of the cover, and a gasket seated in each groove, said method comprising the steps of inserting gaskets into each groove formed in the upper portion of the manifold, applying silicone sealant between the inner surface of the cover and the lower edge portion of the manifold, inserting the inlet tube and the outlet tube of the manifold into the first hole and the second hole of the cover, and locking and sealing the manifold to the inner surface of the top wall of the cover by ultrasonically vibrating the manifold to the inner surface of the top wall of the cover, by compressing each gasket between the manifold and the inner surface of the top wall of the cover and by sealing between the inner surface of the cover and the lower edge portion of the manifold with the silicone sealant.

20. A method of closing a pressure vessel which comprises a cover having a top wall and an inner surface, a bowl positioned below the cover and having a bottom wall and an outer surface, sealing means positioned between the cover and the bowl for sealing between the cover and the bowl, securing means for securing the cover to the bowl, said securing means including a track comprising a first groove formed in the inner surface of the cover and a second groove formed in the outer surface of the bowl and being aligned with the first groove, an opening formed in the cover for providing an entrance to said track, and a flexible shear rod received in said track, said method comprising the steps of inserting the bowl into the cover until the first groove and the second groove of the track are aligned, contacting the sealing means with the inner surface of the cover and the outer surface of the bowl, and snaking the flexible shear rod into the track through the opening in the cover.

21. A method of purifying and/or filtering a fluid with a pressure vessel which comprises a cover having a top wall and an inner surface, a bowl positioned below the cover and having a bottom wall and an outer surface, sealing means positioned between the cover and the bowl for sealing between the cover and the bowl, securing means for securing the cover to the bowl, said securing means including a track comprising a first groove formed in the inner surface of the cover and a second groove formed in the outer surface of the bowl and being aligned with the first groove, an opening formed in the cover for providing an entrance to said track, a flexible shear rod received in said track, a manifold mounted to the inner surface of the top wall of the cover, said manifold having an upper portion, said manifold including a hollow inlet tube and a hollow outlet tube formed in its upper portion and protruding from the first and second holes of the cover, said manifold having a sealing port formed therein aligned with the hollow outlet tube, and a cartridge mounted on the sealing port and on the bottom wall of the bowl, said method comprising the steps of passing pressurized, untreated fluid into the pressure vessel through the inlet tube of the manifold, directing the untreated fluid to the cartridge, purifying and/or treating the untreated fluid by passing it through the cartridge, and removing the treated fluid from the pressure vessel through the outlet tube of the manifold.

* * * * *